United States Patent
Veilleux, Jr.

(10) Patent No.: US 11,781,483 B1
(45) Date of Patent: Oct. 10, 2023

(54) MINIMUM PRESSURE VALVE FOR AIRCRAFT FUEL SYSTEM

(71) Applicant: Hamilton Sundstrand Corporation, Charlotte, NC (US)

(72) Inventor: Leo J. Veilleux, Jr., Wethersfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/735,440

(22) Filed: May 3, 2022

(51) Int. Cl.
| F02C 7/232 | (2006.01) |
| F02C 9/26 | (2006.01) |
| F02C 7/228 | (2006.01) |
| F02C 7/236 | (2006.01) |

(52) U.S. Cl.
CPC .............. *F02C 7/232* (2013.01); *F02C 7/228* (2013.01); *F02C 7/236* (2013.01); *F02C 9/263* (2013.01); *F05D 2220/323* (2013.01)

(58) Field of Classification Search
CPC .... F02C 9/26; F02C 9/263; F02C 9/28; F02C 9/30; F02C 9/32; F02C 9/34; F02C 9/38; F02C 9/44; F23N 2235/12; F23N 2235/16; F23N 2235/24
See application file for complete search history.

(56) References Cited

U.S. PATENT DOCUMENTS

| 4,591,317 | A | * | 5/1986 | Markunas | ................ | F02C 7/236 417/310 |
| 5,235,806 | A | * | 8/1993 | Pickard | ..................... | F02C 9/46 60/39.281 |
| 6,321,527 | B1 | * | 11/2001 | Dyer | ........................ | F02C 9/263 60/39.281 |
| 6,381,946 | B1 | * | 5/2002 | Wernberg | ................ | F02C 9/263 60/39.281 |
| 7,007,452 | B1 | * | 3/2006 | Baryshnikov | ........... | F02C 7/232 60/734 |
| 7,131,274 | B2 | * | 11/2006 | Baryshnikov | ........... | F02C 7/232 60/772 |
| 7,234,293 | B2 | * | 6/2007 | Yates | ....................... | F02C 7/236 60/734 |
| 7,337,761 | B2 | * | 3/2008 | Bickley | ................... | F02C 7/232 60/734 |
| 7,841,841 | B2 | * | 11/2010 | Arnett | ........................ | F02C 7/22 417/296 |
| 8,256,445 | B2 | * | 9/2012 | Arnett | .................. | G05D 16/166 137/115.15 |
| 8,499,542 | B2 | | 8/2013 | Zebrowski | | |

(Continued)

*Primary Examiner* — Alain Chau
(74) *Attorney, Agent, or Firm* — CANTOR COLBURN LLP

(57) ABSTRACT

A valve having a first segment between a first outer wall and a first inner wall and has a first outer port near the first outer wall and a side port between the first inner and outer walls; a second segment between a second outer wall and a second inner wall and has a second outer port near the second outer wall; a center segment between the first and second inner walls, and a center port; and a piston within the valve, having: a first piston head in the first segment that slides to block and unblock the side port; a second piston head in the second segment that slides between the second inner and outer walls, the second piston head having a surface area that is the same as the first piston head; and a shaft connecting the first and second piston heads.

10 Claims, 2 Drawing Sheets

(56) References Cited

U.S. PATENT DOCUMENTS

| | | | | |
|---|---|---|---|---|
| 8,893,466 B2* | 11/2014 | Reuter | ............ | F02C 9/263 |
| | | | | 60/734 |
| 10,502,138 B2 | 12/2019 | Reuter et al. | | |
| 11,378,018 B2* | 7/2022 | Zielinski | ............ | F02C 9/28 |
| 2005/0262824 A1* | 12/2005 | Yates | ............ | F02C 7/232 |
| | | | | 60/39.281 |
| 2005/0279079 A1* | 12/2005 | Baryshnikov | ............ | F02C 7/232 |
| | | | | 60/39.094 |
| 2006/0236981 A1* | 10/2006 | Bickley | ............ | F02C 7/232 |
| | | | | 123/506 |
| 2007/0017206 A1* | 1/2007 | Baryshnikov | ............ | F02C 7/232 |
| | | | | 60/39.094 |
| 2008/0289338 A1* | 11/2008 | Desai | ............ | F04C 14/02 |
| | | | | 60/734 |
| 2009/0053077 A1* | 2/2009 | Arnett | ............ | F15B 13/0402 |
| | | | | 417/302 |
| 2009/0320937 A1* | 12/2009 | Arnett | ............ | G05D 16/166 |
| | | | | 137/535 |
| 2012/0234015 A1* | 9/2012 | Reuter | ............ | F02C 9/263 |
| | | | | 60/734 |
| 2014/0205472 A1* | 7/2014 | Hutto, Jr. | ............ | F02C 7/236 |
| | | | | 417/244 |
| 2015/0096301 A1* | 4/2015 | Chabaille | ............ | F23R 3/28 |
| | | | | 239/584 |
| 2021/0388773 A1* | 12/2021 | Zielinski | ............ | G05D 7/0647 |

* cited by examiner

MINIMUM PRESSURE VALVE FOR AIRCRAFT FUEL SYSTEM

BACKGROUND

The embodiments are directed to valves and, more specifically, to a minimum pressure valve for an aircraft fuel management system.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A fuel system for a gas turbine engine meters and controls fuel flow to the combustor and other portions of the gas turbine engine that utilizes fuel flow and pressure for operating actuators and other control elements. This flow is created by a one or more fuel pumps. At times (e.g., during startup, cruise, and shutdown of the gas turbine engine) pressure from the pumps may be below desired levels for operation. To control pressure to other elements of the gas turbine engine to a predetermined minimum pressure. One approach is to provide a minimum pressure valve (MPV) between the pump and the combustor. The valve is configured so as not to affect fuel flow delivered to the engine when the valve modulates in response to steady state operating changes or fuel system disturbances so as to maintain minimum pressure.

Fuel systems for aircrafts may include flow divider valves that divide fuel between primary and secondary nozzles in the engine combustor. Actuation of the divider valves may result in transient pressure conditions that impact the minimum pressure valve and fuel flow therethrough. The flow divider valve transiently responds to a solenoid command to engage in an equalized or unequalized pressure mode between the primary and secondary engine nozzles. The fuel system flow divider valve can switch between these preferred flow divider modes to reduce engine combustor acoustic noise.

BRIEF SUMMARY

Disclosed is a minimum pressure valve, including: a valve body that includes: a first segment that extends between a first outer wall and a first inner wall and a includes a first outer port formed therein near the first outer wall and a side port formed between the first inner and outer walls; a second segment that extends between a second outer wall and a second inner wall and includes a second outer port formed therein near the second outer wall; a center segment that extends between the first and second inner walls, and includes a center port formed therein; and a piston disposed within the valve body, including: a first piston head in the first segment, configured to slide toward the first inner wall to block the side port and toward the first outer wall to unblock the side port, the first piston head having a first surface area; a second piston head in the second segment, and configured to slide between the second inner and outer walls, the second piston head having a second surface area that is the same as the first surface area; and a shaft connecting the first and second piston heads, wherein, in operation: the first and second piston heads are configured to slide together in response to flow at the first and second outer ports; and transient pressure disturbances at the side port result in equal and opposite forces against the first and second piston heads.

In addition to one or more of the above disclosed aspects of the valve, or as an alternate, the first segment has a first diameter; the second segment has a second diameter; and the center segment has a third diameter that is smaller than both the first and second diameters to define the first inner wall in the first segment and the second inner wall in the second segment.

In addition to one or more of the above disclosed aspects of the valve, or as an alternate, the valve includes a seal disposed at the first inner wall, wherein the first piston head is configured to press against the seal when the first piston head slides toward the first inner wall.

In addition to one or more of the above disclosed aspects of the valve, or as an alternate, the seal is an o-ring.

In addition to one or more of the above disclosed aspects of the valve, or as an alternate, the valve includes a biasing member disposed in the first segment, seated between the first piston head and the first outer wall.

In addition to one or more of the above disclosed aspects of the valve, or as an alternate, the biasing member is a compression spring.

Disclosed is a fuel system of an aircraft, including: a minimum pressure valve having one or more of the above disclosed aspects; and a fuel source that supplies fuel to the minimum pressure valve.

In addition to one or more of the above disclosed aspects of the fuel system, or as an alternate, the first segment has a first diameter; the second segment has a second diameter; and the center segment has a third diameter that is smaller than both the first and second diameters to define the first inner wall in the first segment and the second inner wall in the second segment.

In addition to one or more of the above disclosed aspects of the fuel system, or as an alternate, the fuel system includes a seal disposed at the first inner wall, wherein the first piston head is configured to press against the seal when the first piston head slides toward the first inner wall.

In addition to one or more of the above disclosed aspects of the fuel system, or as an alternate, the seal is an o-ring.

In addition to one or more of the above disclosed aspects of the fuel system, or as an alternate, the minimum pressure valve further includes: a biasing member disposed in the first segment, seated between the first piston head and the first outer wall.

In addition to one or more of the above disclosed aspects of the fuel system, or as an alternate, the biasing member is a compression spring.

In addition to one or more of the above disclosed aspects of the fuel system, or as an alternate, the fuel system includes a supply conduit; a metering valve that is fluidly coupled to the first supply conduit, wherein: the supply conduit includes an unmetered segment that is upstream of the metering valve and fluidly coupled to the second port, and a metered segment that is downstream of the metering valve and fluidly coupled to the center port; a discharge conduit that is fluidly coupled to the first port; and a pressure regulating valve that includes first solenoid that is fluidly coupled to the pressure regulating valve, which is fluidly coupled to the metering valve and the discharge conduit, and wherein the supply conduit and discharge conduit are fluidly coupled to each other via the pressure regulating valve.

In addition to one or more of the above disclosed aspects of the fuel system, or as an alternate, the fuel system includes a gear pump, fluidly coupled to the supply conduit;

a boost pump; an inter-pump conduit fluidly coupling the boost and gear pumps, and the inter-pump conduit is fluidly coupled to the discharge conduit; and a pump drive operationally coupled to the boost and gear pumps.

In addition to one or more of the above disclosed aspects of the fuel system, or as an alternate, the fuel system includes primary fuel discharge nozzles; secondary discharge nozzles; and a flow divider valve that includes a second solenoid, fluidly coupled to the side port and the primary and secondary discharge nozzles.

In addition to one or more of the above disclosed aspects of the fuel system, or as an alternate, the fuel system includes a digital controller, wherein the first and second solenoids are operationally coupled to the digital controller.

Further disclosed is an aircraft including a fuel system having one or more of the above disclosed aspects.

BRIEF DESCRIPTION OF THE DRAWINGS

The present disclosure is illustrated by way of example and not limited in the accompanying figures in which like reference numerals indicate similar elements.

DETAILED DESCRIPTION

A detailed description of one or more embodiments of the disclosed apparatus and method are presented herein by way of exemplification and not limitation with reference to the figures.

Figure 1:
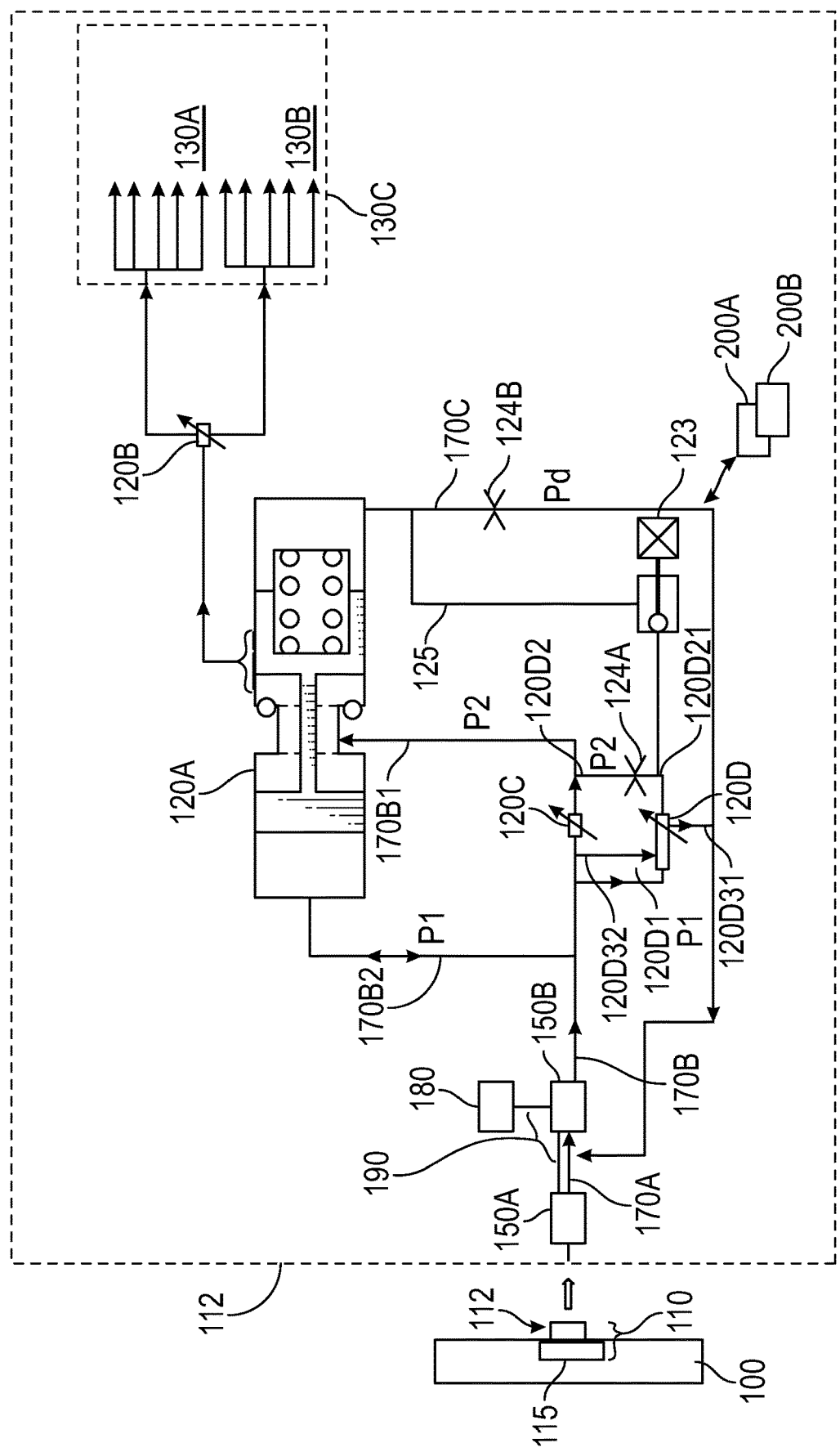
FIG. 1 shows a fuel management system of an aircraft according to an embodiment.

FIG. 1 shows an aircraft 100 having a metered fuel management system, referred to as a fuel system 110 for simplicity, which maybe at least partially onboard its engine 112. The fuel system 110 includes a fuel supply 115 such as a fuel tank in a wing. The fuel system 110 delivers fuel to through a minimum pressure (shut off) valve (MPV for minimum pressure valve, or MPSOV for minimum pressure shut off valve) 120A to a flow divider valve 120B that divides the fuel flow between primary and secondary nozzles 130A, 130B of a combustor 130C of a gas turbine engine 112. As disclosed in greater detail below, the minimum pressure valve 120A is configured to compensate for transient pressure changes that may occur from actuation of the flow divider valve 120B.

As shown in FIG. 1, the fuel system 110 includes one or more pumps that provide fuel to the combustor 130C through the MPV 120A. As shown by way of example only, the system 100 includes a boost pump 150A that is fluidly coupled to the fuel supply 115 on its upstream side and a gear pump 150B on its downstream side via an inter-pump conduit 170A. A pump drive 180 is operationally coupled to the boost and gear pumps 150A, 150B via respective shafts 190. Of course, other pumping arrangements could be utilized.

A supply conduit 170B is fluidly coupled to an output of the gear pump 150B. A return or discharge conduit 170C is fluidly coupled to the inter-pump conduit 170A and the minimum pressure valve 120A. Downstream of the gear pump 150B, a metering valve 120C is provided in the supply conduit 170B which may be controlled by an LVDT (linear variable displacement transducer) 200A that may be operationally coupled to an engine digital control 200B. A pressure regulating valve (PRV) 120D is fluidly coupled to the supply conduit 170B at the metering valve 120C. The PRV 120D has pressure sensing lines 120D1, 120D2 which are utilized to ensure the pressure differential around the metering valve 120C is within an acceptable range. The PRV 120D is utilized in shutdown when a first solenoid valve is operationally coupled to a digital controller 200 of the engine 140. During shutdown the solenoid 123 hydraulically couples the PRV pressure sense line 120D21 to the pressure sense line 125 resulting in additional bypass of flow from flow path 120D32 to return line 120D31 thru PRV 120D. In addition, the MPSOV 120A is signaled to close via pressure sense line 125. The supply and return conduits 170B, 170C are fluidly coupled to each other via the PRV 120D, e.g., via the return line 120D31 fluidly connected to the flow path 120D32 within the PRV 120D, e.g., via an outlet port of the PRV 120D. A metered segment 170B1 of the supply conduit 170B is fluidly coupled to the metering valve 120C and configured to transport metered flow from the metering valve 120C to the minimum pressure valve 120A. An unmetered segment 170B2 of the supply conduit 170B, which is upstream of the metering valve 120C, between the metering valve 120C and the gear pump 150B, is configured to transport unmetered flow to the minimum pressure valve 120A.

The PRV 120D maintains a small pressure differential around it so that pressure at the unmetered supply conduit 170A2, which is P1, is slightly higher (e.g., 40-60 PSID) than pressure at metered supply conduit 170A1, which is P2. Pressure at the return conduit 170B is Pd, which is the same as boost pressure. A flow divider solenoid commanded FDV transient resets the output pressure by about 100 PSI for combustor acoustic tonal purposes. This pressure change will translate through the system all the way back to the return conduit 170B. The min pressure valve 120A will stroke to a new force balance position for the new pressure setting. P2 pressure in the unmetered segment 170B2 and P1 pressure in the metered segment 170B1 will adjust and the PRV 120D will adjust its bypass area to maintain the right flow bypass flow across PRV 120D from line 120D32 to 120D31 since the pressure P1 120D32 to Pd 120D31 has shifted so as to hold the P1-P2 (120D1-120D2 pressure) to maintain constant delta pressure set approximately around 40-60 PSID across the metering valve 120C.

Figure 2:
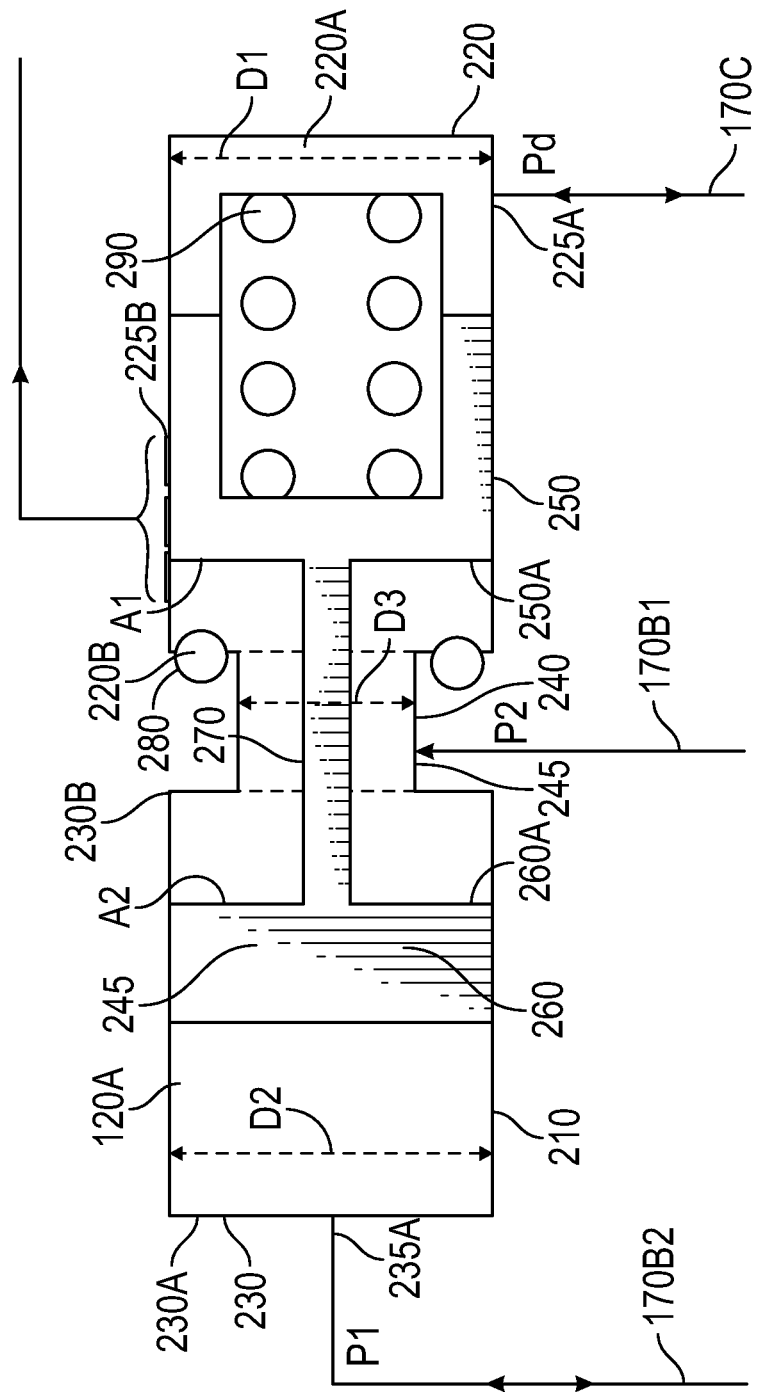
FIG. 2 shows a minimum pressure valve of the fuel management system.

Turning to FIG. 2, the minimum pressure valve 120A includes a valve body 210. A first segment 220 of the valve body 210 extends between a first outer wall 220A and a first inner wall 220B. The first segment 220 includes a first outer port 225A formed near the first outer wall 220A and a side port 225B, which also may be a plurality of ports, formed between the first inner and outer walls 220A, 220B. The first outer port 225A is fluidly coupled to the discharge conduit 170C downstream of the PRV 120D. The side port 225B is coupled to the primary and secondary nozzles 130A, 130B via a flow divider valve (FDV) 120B.

A second segment 230 of the valve body 210 extends between a second outer wall 230A and a second inner wall 230B and includes a second outer port 235A formed near the second outer wall 230A. The second outer port 235A is fluidly coupled to the unmetered segment 170B2 of the supply conduit 170B. A center segment 240 of the valve body 210 extends between the first and second inner walls 220B, 230B, and includes a center port 245 formed between the first inner and second inner walls 220B, 230B. The center port 245 is fluidly coupled to the metered segment 170B1 of the supply conduit 170B.

The MPV 120A houses a piston 245 within the valve body 210. A first piston head 250 of the piston 245 is disposed in the first segment 210. The first piston head 250 is configured to slide toward the first inner wall 220B to block the side port 225B and toward the first outer wall 220A to unblock the side port 225B. The first piston head 250 has a first surface area A1, e.g., defined by its inner facing surface 250A that faces the center segment 240. A second piston head 260 of the piston 245 is disposed in the second segment 230. The second piston head 260 is configured to slide between the second inner and outer walls 230B, 230A. The second piston head 260 has a second surface area A2, defined by its inner facing surface 260A that faces the center segment 240, that is the same as the first surface area A1, i.e., they have equal swept areas. A shaft 270 of the piston 245 connects the first and second piston heads 250, 260. In operation, the first and second piston heads 250, 260 are configured to slide together in response to flow at the first and second outer ports 225A, 235A.

The first segment 220 has a first diameter D1. The second segment 230 has a second diameter D2. The center segment 240 has a third diameter D3 that is smaller than both the first and second diameters D1, D2. This configuration defines the first inner wall 220B in the first segment 220 and the second inner wall 230B in the second segment 230. A seal 280 is disposed at the first inner wall 220B. The first piston head 250 is configured to press against the seal 280 when the first piston head 250 slides toward the first inner wall 220B. This prevents fluid from flowing through the side port 225B. In one embodiment, the seal 280 is an o-ring.

A biasing member 290 is disposed in the first segment 220. The biasing member 290 is seated between the first piston head 250 and the first outer wall 220A. The biasing member 290 may be a compression spring. Thus, when flow pressure is below a minimum threshold, the first piston head 250 is normally biased to move and seal off the side port 225B, shutting off the fuel flow to the combustor nozzles 130A, 130B. That is, the spring closes the valve 120A so that no flow goes from the metered segment 170B1 to the FDV 120B until pressure, e.g., from the gear pump 150B, reaches a specific level. When this happens, the unmetered supply segment 170B2 (pressured at P1) will push the piston heads 150, 160 to the left. The balance is achieved by having closed circuit with pressures P1 and Pd.

Pressure that moves the piston heads 150, 160 in either direction include P1 urging the second piston head 160 toward the center segment 240 and the combination of Pd, which may be significantly less than P1 or P2, and pressure from spring 290 urging the first piston head 250 toward the center segment 240. Forces generated by P2 as well as transient pressures at the side port 225B, are cancelled out within the valve 120A. This is because of the equivalent exposed surface areas A1, A2, i.e., equal swept areas, of the first and second piston heads 150, 160, that generate forces in equal and opposite directions.

The minimum pressure valve 120A as described functions as a transient flow compensation valve. That is, transient pressure disturbances at the side port 225B by actuation of the flow divider valve 120B will result in equal and opposite forces against the first and second piston heads 250, 260. This prevents shifting of the first piston head 250 against the side port 225B. As a result, fuel flow perturbations to the combustor nozzles 130A, 130B are prevented. The disclosed configuration reduces and potentially avoids the possibility of urging, from transient pressure changes, the first piston head 250 to open or close the side port 225B, which could adversely impact burn requirements. That is, the pistons heads translate together and have equal areas so that motion in either direction results in no net volumetric displacement of the metered flow. The MPSOV 120A will stroke to a new force balance position since pressure 170B on the non-spring side of the MPSOV assembly will change with 100PSI FDV transient, and the MPSOV 120A right-side (relative to the figure) spring cavity is at line 125 (approx. Pd other side of orifice Pd, e.g., at orifice 124B) however the MPSOV 120A will not consume or displace fluid from or to the metered flow path. Orifice (first orifice) 124A is a damping orifice, utilized for the stability of the PRV 120D and orifice (second orifice) 124B is a dampening orifice for stability of the MPSOV 120A. For a shutdown, solenoid 123 is opened electrically via the LVDTA and engine controller 200A, 200B and fluidly connects P2 sense line 120D2 through orifice 124A, solenoid 123, line 125, orifice 124B, to discharge conduit (line) 170c to Pd. In response to this connection, MPSOV 120A closes fuel to combustor and PRV 120D fully opens bypassing flow from 120D32 to 120D31.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A fuel system of an aircraft, comprising:
a minimum pressure valve, comprising:
a valve body that includes:
  a first segment that extends between a first outer wall and a first inner wall and includes a first outer port formed therein near the first outer wall and a side port formed between the first inner and outer walls;
  a second segment that extends between a second outer wall and a second inner wall and includes a second outer port formed therein near the second outer wall;
  a center segment that extends between the first and second inner walls, and includes a center port formed therein; and
a piston disposed within the valve body, including:
  a first piston head in the first segment, configured to slide toward the first inner wall to block the side port and toward the first outer wall to unblock the side port, the first piston head having a first surface area;
  a second piston head in the second segment, and configured to slide between the second inner and outer walls, the second piston head having a second surface area that is the same as the first surface area; and a shaft connecting the first and second piston heads, wherein, in operation:

the first and second piston heads are configured to slide together in response to flow at the first and second outer ports; and transient pressure disturbances at the side port result in equal and opposite forces against the first and second piston heads;

a fuel source that supplies fuel to the minimum pressure valve;

a supply conduit;

a metering valve that is fluidly coupled to the supply conduit, wherein:

the supply conduit includes an unmetered segment that is upstream of the metering valve and fluidly coupled to the second outer port, and a metered segment that is downstream of the metering valve and fluidly coupled to the center port;

a discharge conduit that is fluidly coupled to the first outer port; and a pressure regulating valve that includes a first solenoid that is fluidly coupled to the pressure regulating valve, which is fluidly coupled to the metering valve and the discharge conduit, and wherein the supply conduit and discharge conduit are fluidly coupled to each other via the pressure regulating valve.

2. The fuel system of claim 1, wherein:

the first segment has a first diameter;

the second segment has a second diameter; and the center segment has a third diameter that is smaller than both the first and second diameters to define the first inner wall in the first segment and the second inner wall in the second segment.

3. The fuel system of claim 2, further comprising:

a seal disposed at the first inner wall, wherein the first piston head is configured to press against the seal when the first piston head slides toward the first inner wall.

4. The fuel system of claim 3, wherein the seal is an o-ring.

5. The fuel system of claim 2, further comprising:

a biasing member disposed in the first segment, seated between the first piston head and the first outer wall.

6. The fuel system of claim 5, wherein the biasing member is a compression spring.

7. The fuel system of claim 1, further comprising:

a gear pump, fluidly coupled to the supply conduit;

a boost pump;

an inter-pump conduit fluidly coupling the boost and gear pumps, and the inter-pump conduit is fluidly coupled to the discharge conduit; and a pump drive operationally coupled to the boost and gear pumps.

8. The fuel system of claim 1, further comprising:

primary fuel discharge nozzles;

secondary discharge nozzles; and a flow divider valve that includes a second solenoid, fluidly coupled to the side port and the primary and secondary discharge nozzles.

9. The fuel system of claim 8, further comprising a digital controller, wherein the first and second solenoids are operationally coupled to the digital controller.

10. An aircraft comprising the fuel system of claim 9.

* * * * *